United States Patent
Ma et al.

(10) Patent No.: US 11,693,883 B2
(45) Date of Patent: Jul. 4, 2023

(54) TECHNIQUES FOR ORDERING PREDICATES IN COLUMN PARTITIONED DATABASES FOR QUERY OPTIMIZATION

(71) Applicant: TERADATA US, INC., Dayton, OH (US)

(72) Inventors: Lu Ma, Tenafly, NJ (US); Grace Kwan-On Au, Rancho Palos Verdes, CA (US)

(73) Assignee: Teradata US, Inc., San Diego, CA (US)

( * ) Notice: Subject to any disclaimer, the term of this patent is extended or adjusted under 35 U.S.C. 154(b) by 0 days.

(21) Appl. No.: 13/728,345

(22) Filed: Dec. 27, 2012

(65) Prior Publication Data

US 2014/0188924 A1 Jul. 3, 2014

(51) Int. Cl.
G06F 16/27 (2019.01)
G06F 16/2453 (2019.01)

(52) U.S. Cl.
CPC ...... *G06F 16/278* (2019.01); *G06F 16/24542* (2019.01)

(58) Field of Classification Search
CPC .............................. G06F 17/30; G06F 16/278
See application file for complete search history.

(56) References Cited

U.S. PATENT DOCUMENTS

| | | | |
|---|---|---|---|
| 7,930,294 B2 | 4/2011 | Shuf | |
| 8,135,703 B2 | 3/2012 | Barsness et al. | |
| 2005/0066151 A1 | 3/2005 | Kottapalli | |
| 2008/0235181 A1* | 9/2008 | Faunce | G06F 16/2453 |
| 2009/0030874 A1* | 1/2009 | Das | G06F 16/24542 |
| 2009/0063527 A1 | 3/2009 | Corvinelli et al. | |
| 2009/0077354 A1 | 3/2009 | Rangan | |
| 2009/0254532 A1* | 10/2009 | Yang | G06F 16/221 |
| 2010/0281017 A1* | 11/2010 | Hu | G06F 16/2455 707/718 |
| 2012/0084278 A1* | 4/2012 | Franke | G06F 16/28 707/719 |

* cited by examiner

*Primary Examiner* — Apu M Mofiz
*Assistant Examiner* — Farhad Agharahimi
(74) *Attorney, Agent, or Firm* — Randy L. Campbell, Jr.

(57) ABSTRACT

Techniques for ordering predicates in column partitioned databases for query optimization. Predicates on a single CP table within a query are organized to predicate-CP nodes with various sets of column partitions. The predicates within each predicate-CP node and the predicate-CP nodes as a whole are ordered in ascending order of cost which is determined by CPU/IO cost and predicate selectivity. The reorganized query is then executed.

2 Claims, 4 Drawing Sheets

TECHNIQUES FOR ORDERING PREDICATES IN COLUMN PARTITIONED DATABASES FOR QUERY OPTIMIZATION

BACKGROUND

In large commercial database systems statistics are often gathered for the tables and other constructs of the database. These statistics are useful in identifying costs, which are used when executing a given query and the statistics are then vital to resolving costs for a given query, and it is the costs that the optimizers use to determine how to execute a given query. Thus, inefficient or inaccurate statistics can adversely impact the performance of the database.

Another way in which queries have been made more efficient is via the underlying structure of the database itself. Traditionally, the database table is organized or partitioned by rows; however, recent techniques have permitted the underlying database table to be stored and partitioned based on columns. So, when a base table is accessed for evaluating a query, instead of reading an entire row having many columns, the database accesses only the column partitions that are referenced in the query and skips the column partitions that are not being used.

Furthermore, the order of accessing column partitions for query evaluation plays an important role in performance as well. So, evaluating predicates, which are more selective at an early time in query processing can, help reduce the number of logical rows that have to be accessed with query processing. On the other hand, evaluating predicates on column partitions that have low read costs at an early time can minimize the total IO cost. Accordingly, the predicates on a single CP table should be ordered in a way that the predicates with the least overall costs are evaluated first.

Existing predicate ordering algorithm for a regular database table just takes into consideration the selectivity and Central Processor Unit (CPU—processor) cost for each predicate. However, the predicate ordering algorithm for a CP table should consider multiple factors. Moreover, the predicates on the same set of column partitions should be evaluated as a group when the required column partitions are accessed. Such approaches would entail the grouping of predicates based on the referenced column partitions using factors beyond what has been available in the industry.

SUMMARY

In various embodiments, techniques for ordering predicates in column partitioned databases for query optimization are presented. According to an embodiment, a method for predicate ordering is provided.

Specifically, a query is scanned to identify all predicates on a single CP table. Next, the predicates are grouped, each group associated with a list of predicates with the same set of column partitions. Finally, the predicates within each group and the groups are ordered for the query's execution.

DETAILED DESCRIPTION

Figure 1:
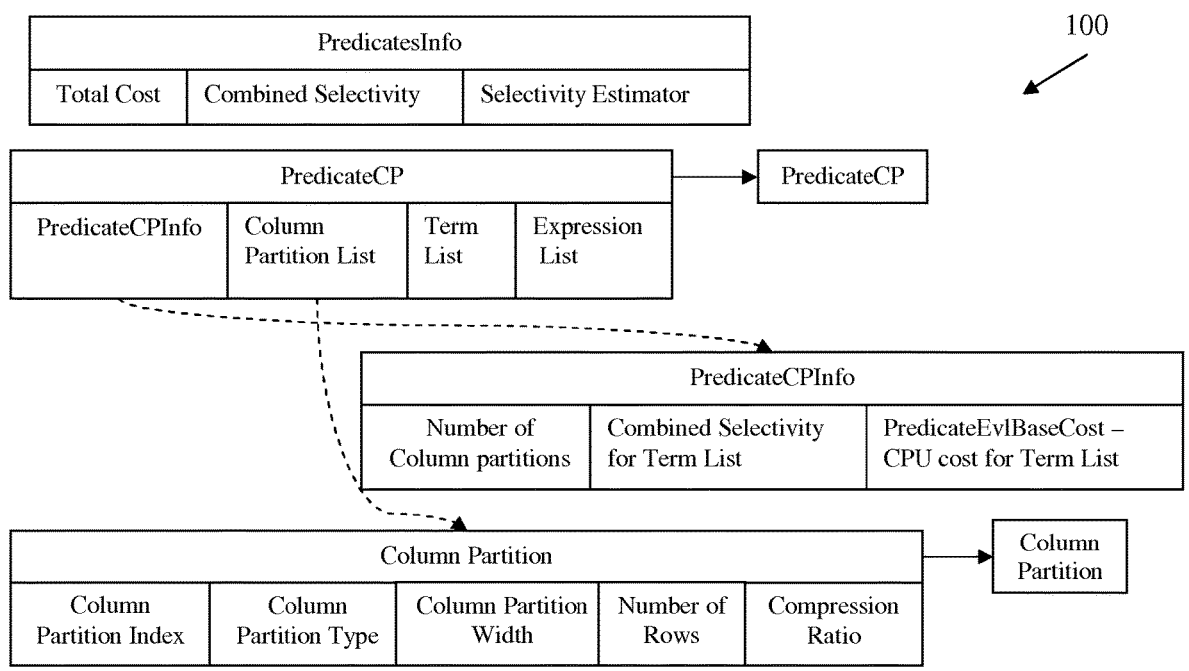
FIG. 1 is a diagram of data structures used by the predicate ordering techniques, according to an example embodiment.

FIG. 1 is a diagram of data structures 100 used by the predicate ordering techniques, according to an example embodiment. The data structures 100 reside and are implemented within memory and/or a non-transitory computer readable medium. These data structures 100 are processed in novel manners discussed herein and below to order predicates in column partitioned databases for query optimization.

So, when a query is submitted, the predicates (operations on columns such as comparisons) on a single Column Partition (CP) table can be of any order. Before arranging them into an optimal order, the predicates are analyzed for the column partitions that are being referenced in the predicates, and are to be grouped based on the referenced column partitions. For this purpose, new data structures 100 are created as illustrated in the FIG. 1.

Referring to the FIG. 1, the "PredicatesInfo" is a summary structure for all predicates on a single CP table. It records a total cost to evaluate those predicates and the combined selectivity for them. The Selectivity Estimator is a class incident used for selectivity estimation and used in calculating the various selectivities needed during the query processing.

The detailed information for predicates is recorded in a list that includes several "PredicateCP" nodes. Each PredicateCP node has a summary information node, "PredicateCPInfo," which records the number of column partitions referenced in the "Term List," (list of predicates with this set of column partitions) the combined selectivity of all terms in the Term List and the CPU evaluation cost for those terms under this PredicateCP node. For each column partition referenced in the Term List, there is a Column Partition node, which records the column partition index, type, width, compression ratio of this column partition and the number of logical rows that needs to be accessed in this column partition.

Predicates Grouping

In a single table access path planning phase, the predicates on a CP table are scanned in the order that they come in. When a predicate is scanned, the following steps are performed to get it into the appropriate grouping.

1) Identify the base table fields and the corresponding column partitions that are referenced in this predicate. An internal mapping function is used to map the base table field identifier (id) to the column partition index.
2) Compare the set of column partitions referenced in this predicate with the set of column partitions under the existing PredicateCP nodes. The entire PredicateCP list is traversed.
3) If a PredicateCP node with the same set of column partitions already exists, link the predicate to the end of the Term List within this PredicateCP node.
4) If none of the PredicateCP nodes has the same set of column partitions, compare the number of column partitions (TermNumCP) for this predicate with the maximum number of CP contexts (MaxNumCPCtx) that the system can handle at one step.
5) If the TermNumCP does not exceed MaxNumCPCtx, create a new PredicateCP node for this predicate. Fill in some information, which is available at this stage, such as the number of column partitions and the column partition list. Make the Term List point to this predicate and then link this new PredicateCP node into the PredicateCP list in the end.

6) If TermNumCP is bigger than MaxNumCPCtx, then link this predicate to the end of the residual conditions that do not belong to any PredicateCP for this CP table. This is because such predicate cannot be evaluated unless the reference column partitions are merged into less number of new column partitions than the MaxNumCPCtx. At the same time, the projection list also needs to be updated to include the column partitions and fields that are needed to evaluate this predicate.

With the above 6 steps, the predicate grouping for one predicate is done. Iterate through all the predicates on a single CP table in the query and after this iteration for all the predicates is complete, a PredicateCP list is built for this CP table and ready to be used for the next step—predicate ordering.

Two-Step Predicate Ordering Algorithm

The predicate ordering is achieved through a two-step algorithm. The first step is the Term List ordering under a PredicateCP node. The second step is the PredicateCP nodes ordering in the PredicateCP list. The algorithms are described below along with a concrete example. Consider a given CP table definition, query, predicate selectivities and base CPU evaluation costs with sufficient CP contexts for the example.

CP Table DDL:

```
CREATE MULTISET TABLE cpdb.t1 ,NO FALLBACK,
    NO BEFORE JOURNAL,
    NO AFTER JOURNAL,
    CHECKSUM = DEFAULT,
    DEFAULT MERGEBLOCKRATIO
    (
    a1 INTEGER NOT NULL,
    b1 INTEGER NOT NULL,
    c1 CHAR(2) CHARACTER SET LATIN NOT
    CASESPECIFIC NOT NULL,
    d1 VARCHAR(5) CHARACTER SET LATIN NOT
    CASESPECIFIC NOT NULL,
    e1 FLOAT NOT NULL,
    f1 FLOAT NOT NULL)
    NO PRIMARY INDEX
    PARTITION BY COLUMN (ROW a1, ROW(b1, c1),
    ROW d1, ROW(e1, f1)) ADD 65528;
```

Query:

```
SELECT *
FROM t1
WHERE a1 > 10      -------- Predicate 1 (Selectivity = 0.3,
                            PredicateEvlBaseCost = 2)
  and e1 + a1 > f1; -------- Predicate 2 (Selectivity = 0.6,
                            PredicateEvlBaseCost = 8)
  and c1 <> 'Aa'   -------- Predicate 3 (Selectivity = 0.9,
                            PredicateEvlBaseCost = 5)
  and b1 = 200     -------- Predicate 4 (Selectivity = 0.1,
                            PredicateEvlBaseCost = 1)
  and d1 = 'ABCD'; -------- Predicate 5 (Selectivity = 0.1,
                            PredicateEvlBaseCost = 3)
```

There are 5 predicates on t1 and the PredicateCP list includes four PredicateCP nodes after the predicate grouping is done.

```
PredicateCP Node 1
    NumCP = 1
    ColPartList = {1}
    TermList = a1 > 0
```

```
PredicateCP Node 2
    NumCP = 2
    ColPartList = {1, 4}
    TermList = e1 + a1 > f1
PredicateCP Node 3
    NumCP = 1
    ColPartList = {2}
    TermList = c1 <> 'Aa' and b1 = 200
PredicateCP Node 4
    NumCP = 1
    ColPartList = {3}
    TermList = d1 = 'ABCD'
```

First Step—Term List Ordering Under a PredicateCP Node

When there are multiple terms under the Term List for a PredicateCP node, those terms are ordered so that the most selective and least costly predicate is evaluated first. As all predicates under the same PredicateCP node are evaluated on the same set of column partitions, the I/O cost for reading those column partitions is the same for every predicate and hence can be excluded from the consideration. Just CPU evaluation costs and selectivity estimates for those predicates are considered. This step utilizes a one-look-ahead algorithm.

For the above example, just predicates under PredicateCP Node 3 need to be ordered using this algorithm. As Predicate 4 has a smaller selectivity and PredicateEvlBaseCost, the overall CPU cost for evaluating Predicate 4 first and Predicate 3 later is less than the CPU cost for evaluating them in the switched order. So, Predicate 4 is adjusted to be in front of Predicate 3. The PredicateCP Node 3 becomes:

```
PredicateCP Node 3
    NumCP = 1
    ColPartList = {2}
    TermList = bi = 200 and c1 <> 'Aa'
```

After the ordering, the combined selectivity and total CPU evaluation cost for all predicates under a PredicateCP node with optimal order are available and filled into the PredicateCPInfo structure. In the case that there is only one predicate under a PredicateCP node, the individual selectivity and CPU evaluation cost are recorded in the PredicateCPInfo structure. When all PredicateCP nodes are handled, the processing goes to the next step.

Second Step—PredicateCP Nodes Ordering in PredicateCP List

In this step, the PredicateCP nodes in the PredicateCP list are ordered so that the column partitions with the most selective predicates and least CPU and I/O cost are accessed first and the predicates on them are evaluated while they are accessed to filter out rows. Another one-look-ahead algorithm is used to achieve this. In this algorithm, the selectivity for each PredicateCP node is the combined selectivity saved in its PredicateCPInfo node. The cost for each PredicateCP node includes two parts though: the total CPU evaluation cost saved in the PredicateCP node and the I/O cost to read the corresponding column partitions for the number of rows passed through the filtering of all previously evaluated predicates (NumAccessedRows).

For each look-ahead path to select a best PredicateCP node from the remaining PredicateCP list, two PredicateCP nodes are considered at one time. The CPU cost of the first PredicateCP node is its PredicateEvlBaseCost multiplied by NumAccessedRows, and I/O cost is the cost of reading NumAccessedRows from the column partitions associated with this node. NumAccessedRows is adjusted by the combined selectivity of all evaluated predicates at that point. The I/O cost is obtained using the internal optcostx_cp( ) function. The CPU cost of a subsequent PredicateCP node is its PredicateEvlBaseCost multiplied by number of rows further qualified by previous PredicateCP nodes, and I/O cost is the cost of reading the further qualified rows from the column partitions associated with this node. If there is only one previous PredicateCP node, the number of qualified rows to read for this PredicateCP node is computed using the combined selectivity of all predicates under that previous PredicateCP node. If there are multiple previous PredicateCP nodes, the number of qualified rows is computed using the combined selectivity obtained from calling OptComputeSelectivity( ) function for all terms in all previously evaluated predicates. Overlapping can occur in the column partitions among PredicateCP nodes. Therefore, in the computation of an I/O cost, the cost for reading a column partition is added, only when it has not been read yet in this path. So, the total cost for these two PredicateCP nodes are:

$$\sum_{i=j,k} (PredicateEvlBaseCost_i + IOCost_i) * NumAccessedRow_i.$$

The look-ahead path is tried for all combinations of any two PredicateCP nodes from the remaining PredicateCP list which has not been ordered yet. The path with a least cost is favored and the first PredicateCP node in this path is picked as the best PredicateCP node. The final PredicateCP list is obtained by doing this for all PredicateCP nodes to be selected and linking the selected PredicateCP nodes together in the order that they are picked. Then, the overall total cost and combined selectivity for all predicates under all PredicateCP nodes are to be recorded in the PredicatesInfo node.

For the above example, the final PredicateCP List becomes:

PredicateCP Node 1
  NumCP = 1
  ColPartList = {1}
    TermList = a1 > 0
PredicateCP Node 2
  NumCP = 1
  ColPartList = {3}
    TermList = d1 = 'ABCD'
PredicateCP Node 3
  NumCP = 1
  ColPartList = {2}
    TermList = b1 = 200 and c1 <> 'Aa'
PredicateCP Node 4
  NumCP = 2
  ColPartList = {1, 4}
    TermList = e1 + a1 > f1

By constructing new data structures, grouping predicates based on referenced column partitions, and utilizing a two-step one-look-ahead algorithm, the predicates on single CP table are ordered in the most optimal way, which is then provided to the query optimizer to determine the access sequence for column partitions of a given CP table with a least amount cost. As should now be apparent, this approach offers superior query performance for CP databases.

Figure 2:
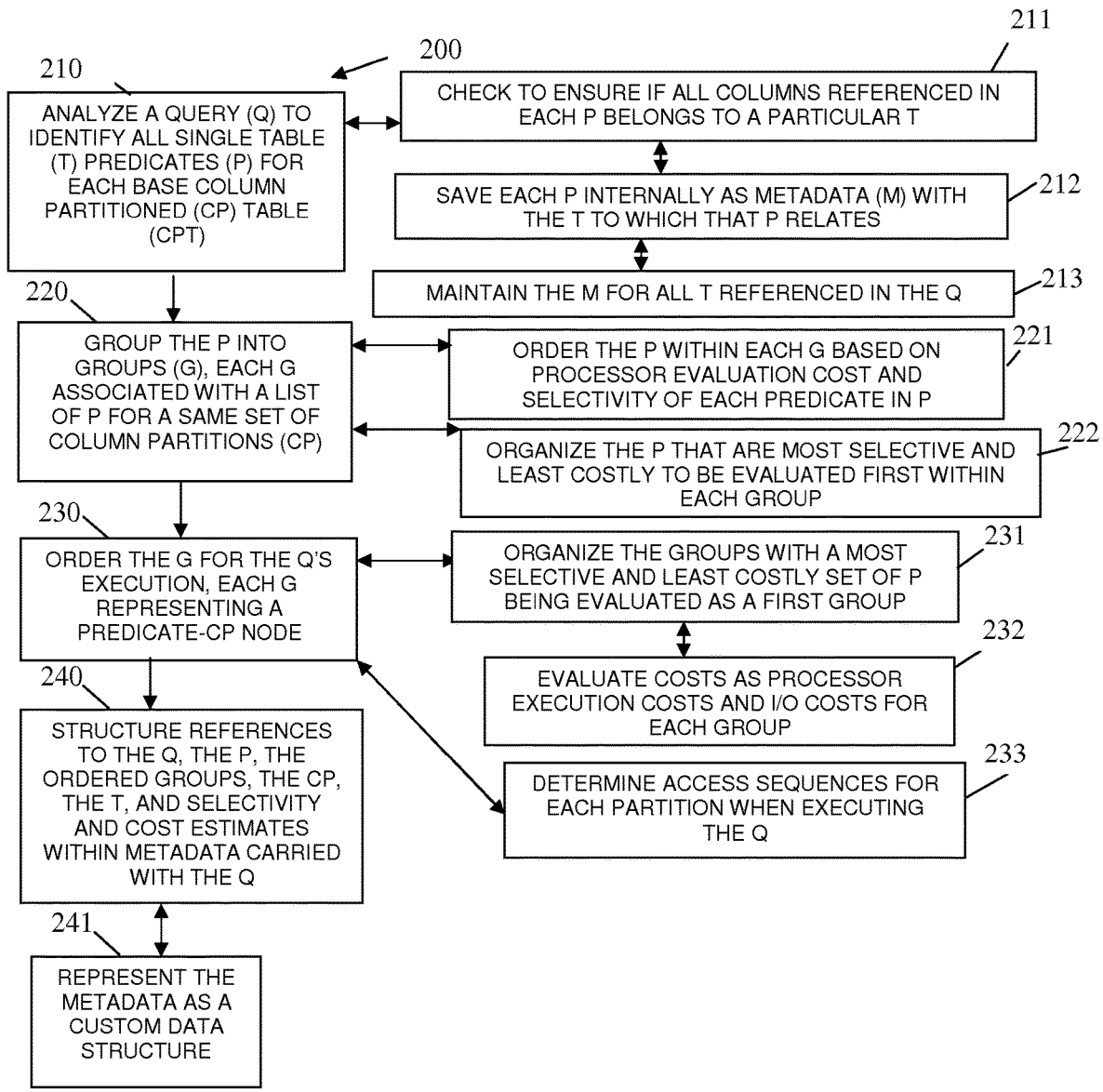
FIG. 2 is a diagram of a method for predicate ordering, according to an example embodiment.

FIG. 2 is a diagram of a method 200 for predicate ordering, according to an example embodiment. The method 200 (hereinafter "CP predicate ordering subsystem in the query optimizer") is implemented as executable instructions within memory and/or a non-transitory computer-readable storage medium that execute on one or a plurality of processors, the processors specifically configured to execute the query optimizer. The query optimizer may also be operational over a network; the network is wired, wireless, or a combination of wired and wireless.

At 210, the query optimizer analyzes a query to identify all single table predicates on a base column partitioned (CP) table. Based on this initial predicates list, the query optimizer performs the predicates grouping/ordering and finally derives the PredicateCP as shown in the FIG. 1.

According to an embodiment, at 211, the query optimizer analyzes each predicate in the query to check to see if all columns references in each predicate belong to a base table. If so, at 212, the query optimizer saves this predicate into an internal data structure, such as metadata, for the base table. The query optimizer, at 213, also maintains such data structures for all base tables referenced in this query, including CP table.

At 220, the query optimizer groups the predicates on one base CP table. Each group is associated with a list of predicates with a same set of column partitions and is recorded in the PredicateCP node with reference to the discussion of the FIG. 1. It should be noted that not all information in the PredicateCP node is available at this stage in the processing, such as the PredicateEvlBaseCost.

In an embodiment, at 221, the query optimizer orders the terms (predicates) within each PredicateCP node based on the CPU (processor) evaluation cost of those terms. So, at 222, the query optimizer organizes the predicates that are most selective and least costly to be evaluated first within each PredicateCP node (group).

At 230, the query optimizer orders the groups for the query's execution.

According to an embodiment, at 231, the query optimizer organizes the groups with a most selective and least costly set of predicates being evaluated as a first group. So, the least costly and most selective nodes are processed first within the query.

Continuing with the embodiment of 231 and at 232, the query optimizer evaluates costs as processor execution costs (CPU costs) and I/O costs for each group. Here, when the nodes (PredicateCP nodes or groups) are being ordered for execution, the I/O costs will vary and so will therefore be part of the evaluation process of costs (unlike within a node where the I/O costs are constant).

In an embodiment, at 233, the query optimizer determines access sequences for each partition when executing the query. The query optimizer may sometimes be referred to as a database optimizer; it evaluates costs to determine a query path or execution plan. This is particularly important for large-scale databases where queries can be quite taxing on processor and memory resources of a database system.

According to an embodiment, at 240, the query optimizer structures the references to the query, the predicates, the ordered groups (predicate-CP nodes), the column partitions, the terms (term lists), and selectivity and cost estimates within metadata carried with the query.

Continuing with the embodiment of 240 and at 241, the query optimizer represents the metadata as a custom data structure, such as the data structure discussed above with reference to the FIG. 1. The data structure can be in memory, on storage, or a combination of in memory and no storage. Moreover, the data structure can be represented within the database via one or more tables.

Figure 3:
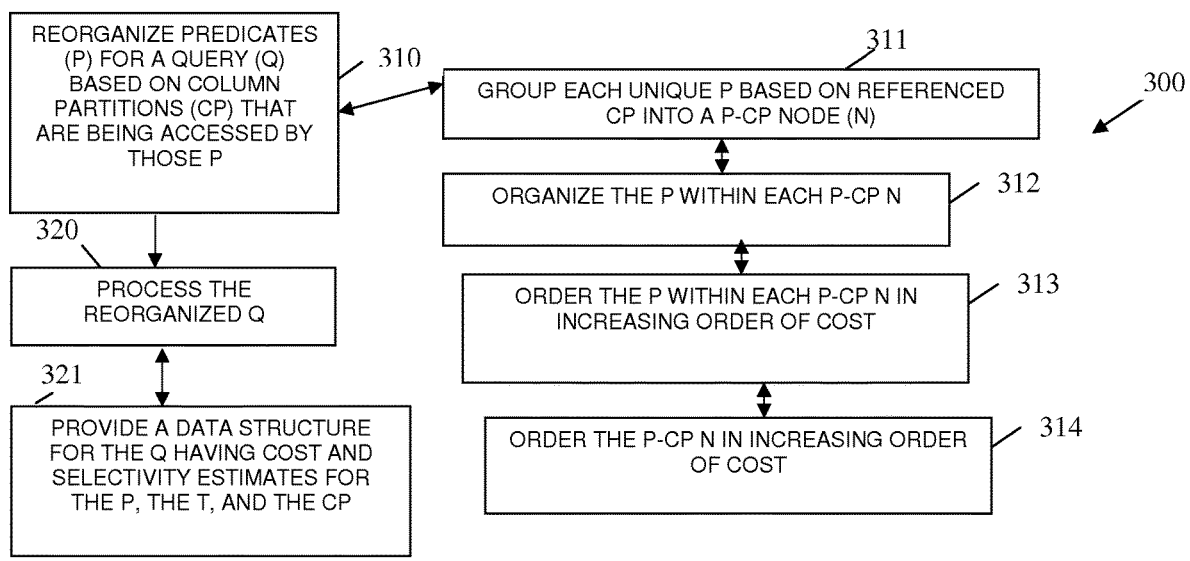
FIG. 3 is a diagram of another method for predicate ordering, according to an example embodiment.

FIG. 3 is a diagram of a method 300 for predicate ordering, according to an example embodiment. The method 300 (hereinafter "query reorganizer") is implemented as executable instructions within memory and/or a non-transitory computer-readable storage medium that execute on one or a plurality of processors, the processors specifically configured to execute the query reorganizer. The query reorganizer may also be operational over a network; the network is wired, wireless, or a combination of wired and wireless.

The query reorganizer presents another and in some instances an enhanced perspective of the predicate ordering subsystem discussed above with reference to the FIG. 2.

At 310, the query reorganizer reorganizes predicates for a query based on column partitions that are being accessed by those predicates within the query. The details of how this reorganization occurs were presented in detail above with reference to the FIG. 1 and FIG. 2.

In an embodiment, at 311, the query reorganizer groups each unique predicate based on referenced column partitions into a predicate-column partitioned (CP) node.

Continuing with the embodiment of 311 and at 312, the query reorganizer organizes the predicates within each PredicateCP node. At 313, the query reorganizer orders the predicates within each PredicateCP node in increasing order of cost based on predicate selectivity. Still continuation, at 314, the query reorganizer ordering the PredicateCP nodes in increasing order of the overall cost associated with each PredicateCP node.

At 320, the query reorganizer processes the reorganized query.

According to an embodiment, at 321, the query reorganizer uses a data structure associated with the query having cost and selectivity estimates for the predicates, the column partitions, and groupings of the predicates and the column partitions.

Figure 4:
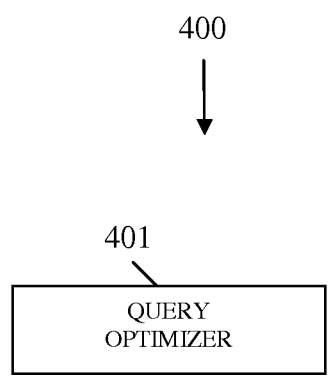
FIG. 4 is a diagram of a predicate ordering system, according to an example embodiment.

FIG. 4 is a diagram of a predicate ordering system 400, according to an example embodiment. The components of the predicate ordering system 400 are implemented as executable instructions and programmed within memory and/or a non-transitory computer-readable storage medium that execute on one or a plurality of processors, the processors specifically configured to execute the components. Moreover, the predicate ordering system 400 is also operational over a network; the network is wired, wireless, or a combination of wired and wireless.

The predicate ordering system 400 implements, inter alia, the FIGS. 1-3, presented in detail above.

The predicate ordering system 400 is a part of a query optimizer 401.

The memory and/or non-transitory computer-readable storage medium are programmed with executable instructions for the query optimizer 401. Example processing associated with the query optimizer 401 was presented in detail above with reference to the FIGS. 1-3.

The query optimizer 401 is configured to reorganize predicates that access column partitions within a query based on selectivity and costs, and to process the reorganized query.

According to an embodiment, the query optimizer 401 is further configured to map selective predicates to groupings of predicates with same column partitions as a predicate-column partitioned (CP) node.

In another case, the query optimizer 401 is configured to organize the predicate-CP nodes in ascending order based on overall cost.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A processor-implemented system, comprising:
a database implemented and programmed within a non-transitory computer-readable storage medium, said database including database tables partitioned on columns, wherein when a base column partitioned (CP) table is accessed by the processor for evaluating a query, the processor accesses only column partitions that are referenced in the query;
a memory programmed with a query optimizer for execution on a processor;
the query optimizer is configured to reorganize predicates that access column partitions within a query based on selectivity and costs, and to process the reorganized query using a summary structure for all predicates on a single CP table that records a total cost to evaluate those predicates and a combined selectivity for those predicates, and each unique predicate grouped based on the column partitions into a predicate-column partition (CP) node having a particular summary structure, each column partition referenced within a particular predicate-CP node is linked to a column partition node which records a column partition index, a column type, a column width, and a compression ratio for that column partition and a total number of logical rows that has to be accessed with that column partition, the query optimizer further configured to structure references to the query, the predicates, the ordered groups, the column partitions, and selectivity and cost estimates within metadata carried with the query.

2. The system of claim 1, wherein the query optimizer organizes the predicate-CP nodes in ascending order based on the overall cost.

* * * * *